United States Patent

[11] 3,584,715

| [72] | Inventor | Donald L. Miller<br>Horseheads, N.Y. |
|---|---|---|
| [21] | Appl. No. | 38,228 |
| [22] | Filed | May 18, 1970<br>Division of Ser. No. 746,523, July 22, 1968 |
| [45] | Patented | June 15, 1971 |
| [73] | Assignee | The Bendix Corporation |

[54] ELECTROMAGNETIC OVERLOAD CLUTCH
5 Claims, 3 Drawing Figs.

[52] U.S. Cl............................................. 192/56R,
192/84C, 192/150
[51] Int. Cl................................................. F16d 43/20,
F16d 27/10
[50] Field of Search................................................ 192/56 R,
84 C, 90, 103, 150

[56] References Cited
UNITED STATES PATENTS

| 3,091,316 | 5/1963 | Huffman ...................... | 192/150 |
| 3,240,304 | 3/1966 | Wickersham................. | 192/56 |
| 3,251,441 | 5/1966 | Winter ........................ | 192/90 X |

*Primary Examiner*—Allan D. Herrmann
*Attorneys*—Robert A. Benziger and Plante, Hartz, Smith and Thompson ABSTRACT: An electromagnetic clutch having an overtorque triggered release which allows reengagement of the torque transmitting members without reducing clutch speed. When overload occurs, the initial slippage of the torque transmitting members cams them apart, reversing the spring-electromagnetic force balance to force the axially movable torque-transmitting member away from the axially stationary torque-transmitting member. Electrical switching means, sensitive to torque and speed, are provided to change the state of current flow in the electromagnetic clutch.

INVENTOR.
Donald C. Miller

WITNESS:
Esther M. Stockton

INVENTOR.
Donald L. Miller
BY
Robert A. Benziger
ATTORNEY

ELECTROMAGNETIC OVERLOAD CLUTCH

REFERENCE TO COPENDING APPLICATION

This case is a division of commonly assigned copending application Ser. No. 746,523, filed July 22, 1968, and entitled "Electromagnetic Overload Clutch".

BRIEF SUMMARY OF THE INVENTION

One simple method of providing overload protection to rotary machinery is to include a slip clutch which will slip at a predetermined level of transmitted torque, permitting the two torque-transmitting clutch elements to slip relative to each other. A disadvantage of this arrangement is that it produces wear between the slipping parts and it tends to transmit some torque while slipping, making it difficult to determine that an overload condition exists. once determined, it then becomes necessary to turn off the prime mover to correct the condition.

Another straightforward solution is to use a sheer pin or toggle means which still permits rotation of the parts and wear until the machinery is shut down. this indicates clearly that an overload condition exists, but is undesirable in the amount of time and effort lost in replacement or resetting.

Another method, as disclosed in applicant's copending commonly assigned application Ser. No. 621,533, now U.S. pat. No. 3,400,795, involves the use of a centrifugal switch triggered by the movement of a mass having an eccentric centroid. The mass is moved by the slippage of components and held in the "off" position by the relocation of its centroid. This arrangement again requires that the prime mover be switched off to allow the clutch to be reset.

In light of the foregoing, it is an object of the present invention to provide an electromagnetic clutch which provides overtorque protection by maintaining the torque-transmitting clutch elements in a spaced-apart relationship subsequent to slippage to minimize wear. It is a further object of the present invention to provide such a clutch which can be reset without reducing the speed of the prime mover.

It is also an object of this invention to provide an electromagnetic clutch which is sensitive to critical overload and can rapidly disengage, but which is not subject to disengagement due to momentary or transient overloads or machinery vibration. It is an object of this invention to provide an electromagnetic clutch which is not subject to wear while an overload condition exists. The invention resides, more particularly, in the interrelation of the various component elements to achieve the beneficial results intended, namely, the provision of an electromagnetic clutch with adjustable maximum torque-transmitting capabilities which does not transmit torque and does not wear during periods of possible overtorque transmission and which is reengageable while the input member is rotating at operating speed. Furthermore, these objectives are achieved in a configuration which permits the addition of electrical switching means which function at either an overtorque or overspeed occurrence.

Other and further objects and advantages of the present invention will be obvious to the man skilled in the art from the claims and appended drawing.

DETAILED DESCRIPTION

Figure 1:
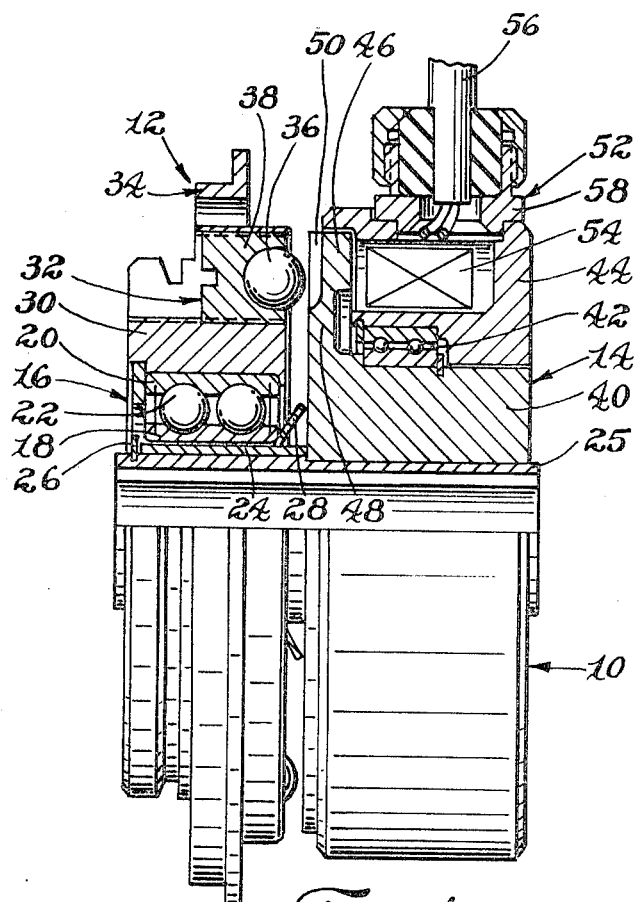
FIG. 1 shows, in partially broken-away elevated section, one embodiment of the clutch made according to the present invention which has a stationary electromagnetic coil and which is coil engaged and spring released.

Referring now to FIG. 1, the clutch 10 according to the present invention, is shown. This clutch has first and second torque-transmitting members, indicated generally by 12 and 14 respectively, either of which may be considered as the input member. For the sake of this description, it will be presumed that the second torque-transmitting member 14 is the input element, and the first torque-transmitting member 12 is the output element.

the first torque-transmitting member 12 consists of a bearing 16, which has inner race 18 and outer race 20 and interconnecting balls 22. The inner race 18 is slidably mounted on a sleeve 24 for sliding movement between a fully disengaged position defined by lock ring 26 and the fully engaged position. The inner race 18, and consequently the first torque-transmitting member 12, is resiliently biased toward the lockring 26 by spring 28 which is shown here as a Belleville spring, but which may be any known type of spring. The outer race 20 is fixedly attached to a permeable ring element 30 which supports the disengagement triggering mechanism 32 and the output mechanism 34.

The disengagement triggering mechanism 32, has a projection which is shown as a ball 36 which, in turn, is rollably retained in a cup member 38. The position of the cup member 38, with respect to the permeable ring element 30, can be axially adjusted to vary the torque limit at which the disengagement-triggering mechanism 32 functions. The output mechanism 34 may be a sprocket or may contain bolt-attaching means or may be splined for mesh with a complementary shaft. Since these constitute known forms, they need not be further discussed.

The second torque-transmitting member 14 consists of a rotary member 40 which is fixedly attached to a shaft member 43 for rotation therewith and bearing 42 which interconnects the rotary member 40 with the stationary magnet body 44.

the rotary member 40 includes a radially extending portion 46 which consists of a tin web 48 and a projection receiving recess 50. The web 48 presents a high reluctance to electromagnetic flux which encourages the flux to cross the gap 38 to ring element 30. The recess 50 is adapted to retain the projecting portion of the ball 36, whenever there exists a torque-exchanging condition. During engagement, the ball 36 is allowed to rotate freely in contact with the friction surface of the second torque-transmitting member 14 until it is in registry with the recess 50 at which time the first and second torque-transmitting members will rotate together.

Also shown in FIG. 1 are the stationary electromagnetic coil means, shown generally as 52, which include the coil 54, electrical leads 56, and the mounting member 58 which is in contact with the magnet body 44.

Figure 2:
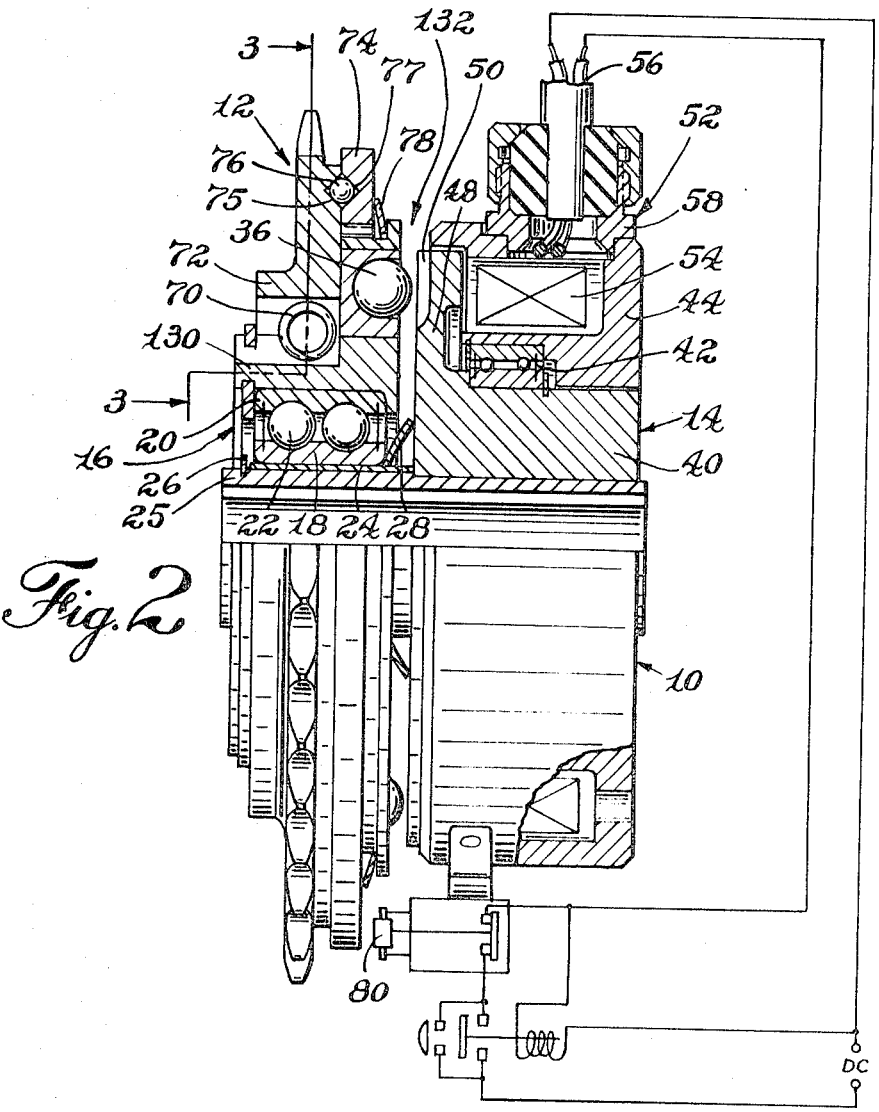
FIG. 2 shows, in partially broken-away elevated section, an embodiment of an electromagnetic clutch according to my invention having plural overtorque means and overspeed protection means.
Figure 3:
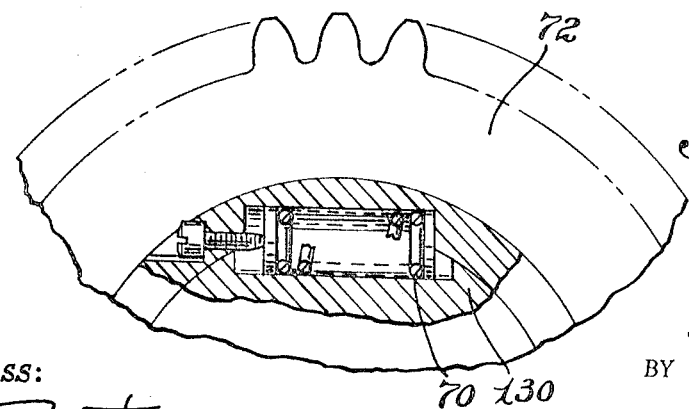
FIG. 3 shows, in partial section, taken along line 3–3 in FIG. 2, the adjustable spring mechanism which constitutes the second method of providing overtorque protection.

Referring now to FIGS. 2 and 3, additional overtorque protection is shown as well as the elements shown in FIG. 1. The second torque-transmitting member 14 and the stationary electromagnetic means 52 remain unchanged, as does the structure radially inward of the outer race 20 of the bearing 16. In this embodiment, the outer race 20 is connected to a ring element 130 which supports two overtorque protective mechanisms. The first of these is similar to that of the fig. 1 embodiment and is identified generally by the numeral 132.

The second of these mechanisms consists of adjustable spring 70, sprocket ring 72, switch-operating ring 74, ring-moving elements 76 located in individual recesses 75 and 77 on sprocket ring 72 and switch-operating ring 74 and bias spring 78. While the switch operating ring 74, disengagement-triggering mechanism 132 and ring element 130 are interconnected for constant relative position, the sprocket element 72 is connected to the ring element 130 by spring 70, so that slight relative rotational movement is possible.

The operation of the disengagement-triggering mechanism 32 and 132 of FIGS. 1 and 2 is as follows. Energization, in excess of the normal level, of the electromagnetic coil, as by providing current in excess of the rated coil current, will generate electromagnetic flux which will attract the first torque-transmitting member 12 into engagement with the second torque-transmitting member 14. The balls 36 will revolve in their respective sockets until they come into registry with the recesses 50. This will allow the two torque-transmitting member 12 and 14, to come into abutting contact thereby reducing to zero the high reluctance air gap therebetween and establishing the troque-exchanging relationship. From the FIGS. , it should be apparent that less than a hemisphere of each ball 36 will be received in its corresponding recess, since only a portion of each ball less than a hemisphere is allowed to project beyond the face of the first torque-transmitting member 12. When a torque-exchanging relationship has been established, the trailing edge of the recess is in contact with the ball at a point which, if connected to the center of the ball, would establish a nonaxially, noncircumferentially extending line. As force is transferred between the torque-transmitting members, along this line, a component of this force would tend to separate the torque-transmitting elements. When this component becomes sufficiently large enough to overcome the electromagnetic attractive force, separation will occur with the spring force now being the dominant force. If the contact between the ball 36 and the recess 50 is a point contact, the first instant of slip will cause the point of contact to shift. This will result in the described line approaching the axially extending centerline of the ball. The result of this shift is that the force which tends to separate the two torque-transmitting members rapidly increases, thereby accelerating the separation of the members. this release action is further assisted by the decrease in the electromagnetic force as the air gap increases.

For every change in the amount of ball projection or exposure, the angle between the described line and the axial direction will also change thus causing the axial component of separation to vary in a determinable manner. This allows easy calculation of the separation force as a function of transmitted force and amount of exposure so that maximum transmitted torque can be selected and seta as a predetermined clutch characteristic.

The additional overtorque protective mechanism shown in FIG. 2 functions in basically the same manner except that overtorque produces a relative rotation between the sprocket ring 72 and the switch-operating ring 74, which, due to the gall or balls 76, causes axial movement of the switch-operating ring 74 into contact with switch 80 which interrupts current flow to the coil 54. This permits the spring 28 to cause disengagement of the torque-transmitting members 12 and 14 as the electromagnetic force falls to zero. These balls 76 may also serve to perform the small switching function in the event of overspeed since the recesses 75 and 77 in which they are carried, may include a radial, as well as a circumferential, profile so that excess speed will increase the centrifugal force acting on the balls 76 and will tend to separate the sprocket ring 72, and the switch operating ring 74.

In the fig. 2 embodiment, I have shown the protective feature of the disengagement-triggering mechanism 132 for those situations in which the overload is so sudden or severe that the torque-exchanging member 12 and 14 are unable to separate before the overload is transmitted to associated machinery. In such an application, the disengagement-triggering mechanism 132 would be adjusted to operate at a torque-transmitting level slightly above that set for the spring 70 and yet low enough to prevent equipment damage. This would also be applicable in mechanical processing operations, such as mail sorting, wherein the items being processed might become jammed and create an overtorque situation. While this might not cause damage to any associated machinery, the item could easily be destroyed unless disengagement of the clutch were immediate, regardless of the circumstances which prompted disengagement.

In each of the embodiments shown, the electromagnetic coil means 52 remains normally energized through out the operating cycle. This permits the proper action to occur in the event of an overtorque situation. In the spring-engaged embodiment, momentary interruption in the flux, as by turning off the exciting current, will permit clutch engagement, while momentary overexcitation, as by increased current flow to the coil 54, will draw the clutch into engagement in the spring-released embodiments.

I claim:

1. An overload protection clutch comprising:

first and second rotational torque-transmitting members axially aligned relative to each other;

said torque-transmitting members mutually engageable to transmit torque;

resilient means operative to bias said first torque-transmitting member toward a first axial position;

electromagnetic coil means arranged in close proximity to said first torque-transmitting member to attract said first torque-transmitting member to a second axial position;

magnet body means adapted to receive and retain electromagnetic coil means;

one of said first and second axial positions constituting the fully engaged position and the other of said first and second axial positions constituting the fully disengaged position;

switching means having an on state and an off state operatively associated with one of said first and second torque-transmitting members operative to control energization of said electromagnetic coil means;

disengagement-triggering means coupled to one of said first and second torque-transmitting members operative to execute movement upon the occurrence of an overload, said movement operative to change the state of said switching means;

said disengagement-triggering means comprising switch-operating means coupled for relative movement to one of said first and second torque-transmitting members, and overload sensing means coupled for relative movement to one of said first and second torque-transmitting members, operative upon overload to move relative to said member and to cause said switch-operating means to execute switching means change of state movement; and said overload sensing means comprise; a ring coupled to one of said first and second torque-transmitting members for relative rotative movement, and resilient interconnecting means interconnecting said ring and said one of said first and second torque-transmitting members operative to establish an overload level below which mutual relative rotation will not occur.

2. The clutch as claimed in claim 1 wherein said resilient interconnecting means are adjustable.

3. An overload protection clutch comprising:

first and second rotational torque-transmitting members axially aligned relative to each other;

said torque-transmitting members mutually engageable to transmit torque;

said first torque-transmitting member biased towards a first axial position by resilient means;

electromagnetic coil means arranged in close proximity to said first torque-transmitting member to attract said first torque-transmitting member to a second axial position;

magnet body means adapted to receive and retain said electromagnetic coil means;

one of said first and second axial positions constituting the fully engaged position and the other of said first and second positions constituting the fully disengaged position;

disengagement-triggering means operative upon overload to move said first torque-transmitting member from the engaged position toward the disengaged position such that the force relationship of the spring and electromagnetic forces reverses and the dominating force completes the disengagement;

switch means operatively associated with said torque-transmitting members to interrupt current flow to said electromagnetic coil means when overload slip occurs; and a switch-operating means having at least one disc member associated with one of said torque-transmitting members operative to cause axial movement of said disc member to contactively abut and alter the state of the switch means;

said switch operating means comprising first and second disc members in axially spaced together relationship coaxially connected to one of said torque-transmitting members, a torque-limiting adjustable spring means interconnecting said first disc member to said one torque-transmitting member and constituting in combination a power output means, said second disc member being splined to said one torque-transmitting member to allow axial movement, spring means operative to bias said first and second disc members toward each other, and said first and second disc members having at least one ball received between said disc members in corresponding notches to force said disc members apart when there exists a mutual relative rotation therebetween.

4. An overload protection clutch as claimed in claim 3 wherein:

said notches have a radially extending ramp surface operative to allow its retained ball to move radially and axially under the influence of centrifugal force; and said ramp surface having an axial travel rate predetermined to cause said axially moveable disc member to execute a rate of axial movement directly related to the rotational speed of said one of said torque-transmitting members.

5. An overload protection clutch as claimed in claim 4 wherein:

said axial movement of said disc member is operative at a predetermined point to contactively abut a switch member of said switch means to alter the state thereof.